July 10, 1962 P. W. WAGNER 3,043,632
WHEEL COVER
Filed Aug. 21, 1958

P. W. WAGNER
INVENTOR.

E. C. McRae
BY J. R. Faulkner
K. L. Zerschling
ATTORNEYS

United States Patent Office 3,043,632
Patented July 10, 1962

3,043,632
WHEEL COVER
Pierce W. Wagner, La Salle, Mich., assignor to Ford Motor Company, Dearborn, Mich., a corporation of Delaware
Filed Aug. 21, 1958, Ser. No. 756,318
9 Claims. (Cl. 301—37)

This invention relates to wheel covers and more particularly to wheel covers which are secured to a wheel through a plurality of retaining clip members.

According to the construction of the present invention, a wheel cover having a main body portion is provided with a generally radially extending flange axially spaced from the periphery of the main body portion. Clip retaining means are provided which have a body part, a first terminal portion at one end thereof engageable with the wheel and a second terminal portion which is positioned between the main body portion and the generally radially extending flange of the wheel cover. The second terminal portion has a generally radially inwardly extending extremity which engages the wheel cover to hold the clip in firm engagement therewith. Preferably, the body part of the clip retaining means is provided with one or more offset tabs which fit over a generally axially extending flange of the wheel cover to secure the body part of the clip retaining means against one side of the axially extending flange.

In fastening the clip retaining means to the wheel cover, the offset tabs of the body parts are positioned over the generally axially extending flange and the second terminal portion is pressed home between the main body portion and the generally radially extending flange of the cover. This arrangement provides a wheel cover assembly which will remain engaged with the wheel under the most adverse operating conditions. It is also apparent that the clip retaining means of the present invention are securely fastened to the wheel cover through simple and inexpensive means and that the method of assembly is also simple and inexpensive.

An object of the present invention is the provision of a wheel cover including clip retaining means which can be securely engaged with a portion of a wheel.

Another object of the invention is to provide a wheel cover including clip retaining means which can be readily secured to the cover with a minimum of time and effort.

A further object of the invention is the provision of a wheel cover including clip retaining means in which integral parts of the clip retaining means are employed to secure the clip retaining means to the wheel cover.

Other objects and attendant advantages of the present invention will become more apparent as the specification is considered in connection with the accompanying drawings in which.

Figure 1:
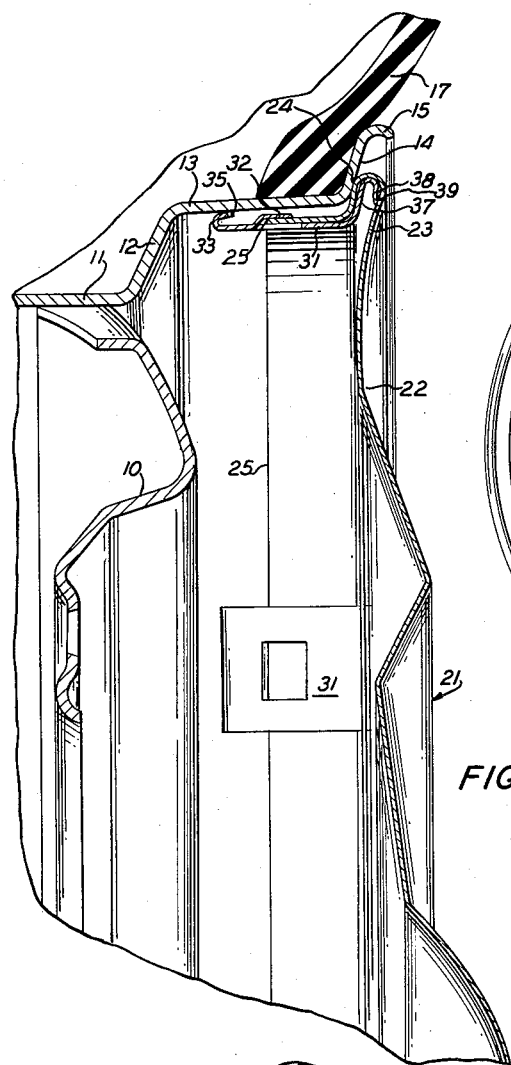
FIGURE 1 is a partial sectional view of one embodiment of the invention showing a wheel, a wheel cover and clip retaining means for securing the wheel cover to the wheel.

Referring now to the drawings, there is shown in FIGURE 1 a wheel including a wheel body 10 having a tire rim 11 of the multiple flange drop center type affixed thereto. The tire rim 11 includes a first side flange 12, a generally axially extending flange 13, a second side flange 14 and a terminal flange 15. The tire rim is adapted to support a tire 17 which may be of the tubeless type as shown.

Figure 4:
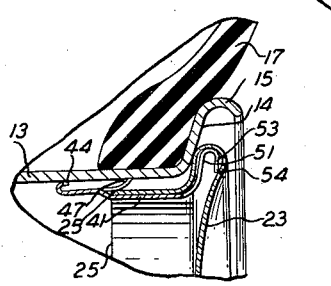
FIGURE 4 is a partial sectional view of another embodiment of the invention.

An ornamental wheel cover generally designated by the numeral 21 is secured to the wheel for covering the wheel body and a portion of the tire rim including the first side flange 12, the generally axially extending flange 13 and a portion of the second side flange 14. The wheel cover includes a main body portion 22 which may be of any suitable configuration but preferably has a generally axially outwardly flaring portion 23 at the outer periphery thereof. A generally radially extending flange 24 is axially spaced inwardly from the outer periphery of the main body portion 22 and may suitably be formed by underturning the outer periphery of the cover to form a generally U-shaped outer margin. A generally axially extending flange 25 of smaller diameter than the generally axially extending flange 13 of the wheel rim extends inwardly from the flange 24 and is adapted to be positioned within the axially extending flange 13 when the cover is mounted in position as shown in FIGURES 1 and 4.

A plurality of clip retaining means 30 is provided to secure the cover to the wheel. One embodiment of the clip retaining means is shown in perspective in FIGURE 3 and is shown in cross-section in FIGURE 1 engaged with the wheel cover and the wheel. This clip retaining means is preferably constructed of spring sheet steel and includes a principal body part 31 having an offset tab 32 struck from the middle portion thereof. As can best be seen by reference to FIGURE 1, this tab lies in a plane parallel to and spaced from the plane of the principal body part. Positioned at one end of the principal body part of the clip retaining means is a first terminal portion 33 which comprises a bent over flange 34 having a plurality of teeth 35 at the outer extremity thereof. This flange extends at an acute angle to and back over the principal body part of the clip retaining means so that when the clip retaining means is affixed to the wheel cover, it extends radially and axially outwardly to engage the generally axially extending flange 13 of the wheel.

A second terminal portion 36 is provided at the other end of the principal body part 31 and includes a leg 37 extending at an angle to the principal body part. This leg has an underturned flange 38 with a plurality of teeth 39 at the outer extremity thereof, so that the second terminal portion forms a generally U-shaped section with a radially inwardly extending extremity which engages the wheel cover at a substantial angle when the clip retaining means are affixed to the cover, as shown in FIGURE 1.

Figure 2:
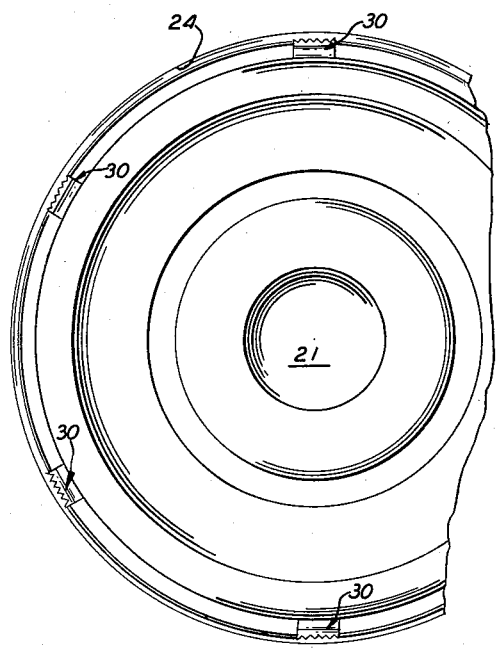
FIGURE 2 is a partial plan view of a wheel cover and clip retaining means of the present invention.

As shown in FIGURE 2, a plurality of the clip retaining means 30 are engaged with the wheel cover. Although various numbers of the clip retaining means may be employed, it is preferred to use six equally spaced about the periphery of the cover. In affixing the clip retaining means to the wheel cover, the principal body part 31 is placed against the inner side of the axially extending flange 25, with the offset tab 32 extending over the end thereof and being positioned on the outer side thereof. A suitable tool is then employed to force the second terminal portion into the space between the main body portion 22 and the generally radially extending flange 24 of the wheel cover so that the teeth 39 engage the wheel cover, preferably the main body portion 22. As can best be seen by reference to FIGURE 1, the underturned flange 38 of the clip retaining means and the generally outwardly flaring portion 23 of the wheel cover intersect at a substantial angle so that the teeth 39 engage the metal of the wheel cover to secure the clip retaining means firmly in place. It can thus be appreciated that the clip retaining means 30 is firmly engaged with the wheel cover by means of the offset tab 32 which holds the principal body part 31 in firm engagement with the axially extending flange 25 and by the engagement of the teeth 39 of the second terminal portion with the wheel cover.

Figure 5:
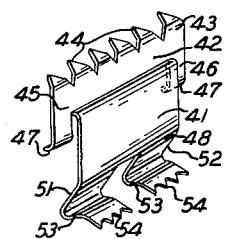
FIGURE 5 is a perspective view of a clip retaining means shown in section in FIGURE 4.

Referring now to FIGURES 4 and 5 there is shown a second embodiment of the invention in which the clip retaining means 30 includes a principal body part 41 having an offset marginal portion 42. The offset marginal portion 42 includes the first terminal portion 43 of the clip retaining means which has a plurality of teeth 44 extending at substantially a right angle thereto. It also includes a pair of tabs 45 and 46 extending in a plane parallel to the plane of the main body portion 41 and being positioned on either side thereof. The tabs may have upturned ends 47 substantially coextensive in length with the teeth 44. Both the teeth 44 and the upturned ends 47 of the tabs 45 and 46 are capable of engaging the generally axially extending flange 13 of the wheel as shown in FIGURE 4. The second terminal portion 48 is substantially the same as the second terminal portion of the embodiment first described except that it is split to form a pair of legs 51 and 52 with each leg being provided with an underturned flange 53 having terminal teeth 54.

Figure 3:
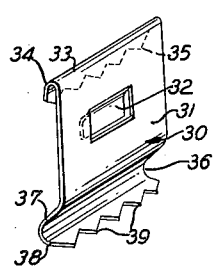
FIGURE 3 is a perspective view of the clip retaining means shown in section in FIGURE 1.

It can readily be appreciated that the method of affixing the clip retaining means of FIGURE 5 to the wheel cover is substantially the same as that employed with the embodiment shown in FIGURE 3. In this instance the principal body part 41 is placed against the inner side of the axially extending flange 25 of the wheel cover with the offset tabs 45 and 46 extending on the other side thereof. A suitable tool is then employed to force both legs and underturned flanges of the second terminal portion into the space between the main body portion of the cover and the generally radially extending flange 24 so that the teeth 54 engage the cover at a substantial angle.

The method of affixing the clip retaining means to the wheel cover of the present invention is particularly well suited to mass production techniques. After all of the clip retaining means which are to be employed have been slipped over the axially extending flange 25 of the wheel cover so that the principal body parts of the clip retaining means and the offset tabs are positioned on opposite sides of the flange, a circular radially expanding tool can be inserted into the spaces between the leg 37 and the underturned flange 38 of the embodiment illustrated in FIGURES 1 and 3, or the legs 51 and 52 and underturned flanges 53 of the embodiment illustrated in FIGURES 4 and 5, of all of the clip retaining means. The tool can then simply be expanded in one operation to force the second terminal portion of all of the clips into the proper engaged position as shown in FIGURES 1 and 4.

It can be noted by an inspection of FIGURE 1 that the generally axially extending flange 13 of the tire rim is slightly inclined so that the diameter of the outer portion thereof is slightly greater than the inner portion thereof. The wheel cover with the clip retaining means affixed thereto is positioned over the wheel with the teeth of the first terminal portions engaging the outer portion of the generally axially extending flange 13. The whole wheel cover assembly is then forced axially inwardly to the position shown in FIGURES 1 and 4 so that the first terminal portions of the clip retaining means are forced radially inwardly. The clip retaining means and the wheel cover acting in combination must have sufficient inherent resiliency to apply a radial force to the generally axially extending flange of the wheel through the terminal portion 33 and 43 of the proper magnitude to secure the wheel cover firmly to the wheel. This can be accomplished by providing the clip retaining means with sufficient resiliency to achieve the purpose and by making the wheel cover of a material having substantially no resiliency. Conversely, the wheel cover may be constructed of a material of sufficient resiliency to accomplish the purpose with the clip retaining means being made from a material of little or no inherent resiliency. On the other hand, the materials used to construct the clip retaining means and the wheel cover may each have a certain amount of resiliency so that the clip retaining means and the cover acting together have the correct resiliency to exert the proper amount of force against the wheel when the cover is engaged therewith.

Thus the present invention provides a wheel cover including clip retaining means which are operative to firmly secure the cover to a wheel in a simple and effective manner.

It will be understood that the invention is not to be limited to the exact construction shown and described, but that various changes and modifications may be made without departing from the spirit and scope of the invention as defined in the appended claims.

What is claimed is:

1. A cover for disposition at the outer side of a vehicle wheel, said cover including a main body portion having an underturned flange at the periphery thereof, clip retaining means for securing said cover to a vehicle wheel, said clip retaining means comprising a body part engaging said cover, a first terminal portion engageable with a vehicle wheel, and a second terminal portion positioned between the main body portion and the underturned flange of said cover, said second terminal portion having a generally radially inwardly extending extremity, said generally radially inwardly extending extremity having a serrated edge engaging said cover.

2. A cover for disposition at the outer side of a vehicle wheel, said cover including a main body portion having an underturned flange at the periphery thereof, clip retaining means for securing said cover to a vehicle wheel, said clip retaining means comprising, a body part engaged with said cover, a first terminal portion engageable with a vehicle wheel, and a second terminal portion positioned between the main body portion and the underturned flange of said cover, said second terminal portion having a generally radially inwardly extending extremity engaging the main body portion of said cover at a substantial angle.

3. A cover for disposition at the outer side of a vehicle wheel, said cover including a main body portion having a generally radially extending flange axially spaced from the periphery of said main body portion, clip retaining means for securing said cover to a vehicle wheel, said clip retaining means comprising a body part engaging said cover, a first terminal portion engageable with a vehicle wheel, and a second terminal portion positioned between the main body portion and the generally radially extending flange of said cover, said second terminal portion having a generally radially inwardly extending extremity including a serrated edge engaging the main body portion of said cover at a substantial angle.

4. In combination, a vehicle wheel, a cover for disposition at the outer side of said vehicle wheel, said vehicle wheel including a generally axially extending flange portion, said cover comprising a main body portion, a generally radially extending flange axially spaced from the periphery of said main body portion having a generally axially extending flange extending inwardly from said generally radially extending flange, clip retaining means for securing said cover to said vehicle wheel, satid clip retaining means comprising, a body part having a portion engaging one side of said generally axially extending flange of said cover, said body part including means engaging the other side of said generally axially extending flange of said cover, a first terminal portion engageable with the generally axially extending flange portion of said vehicle wheel, and a second terminal portion positioned between the main body portion and the generally radially extending flange of said cover, said second terminal portion having a generally radially inwardly extending extremity engaging the main body portion of said cover at a substantial angle.

5. In combination, a vehicle wheel, a cover for disposition at the outer side of said vehicle wheel, said vehicle wheel including a generally axially extending flange portion, said cover comprising, a main body portion, a generally radially extending flange axially spaced from the periphery of said main body portion having a generally axially extending flange extending inwardly from said generally radially extending flange, clip retaining means for securing said cover to said vehicle wheel, said clip retaining means comprising a body part engaging one side of said generally axially extending flange of said cover, said body part having means engaging the other side of said generally axially extending flange of said cover, a first terminal portion engageable with said generally axially extending flange portion of said vehicle wheel, and a second terminal portion positioned between the main body portion and the generally radially extending flange of said cover, said second terminal portion having a generally radially inwardly extending extremity engaging said cover.

6. A cover for disposition at the outer side of a vehicle wheel, said vehicle wheel including a generally axially extending flange portion, said cover comprising a main body portion having an underturned flange at the periphery thereof, a generally axially extending flange extending inwardly from said underturned flange, clip retaining means for securing said cover to said vehicle wheel, said clip retaining means comprising, a principal body part, means for holding said principal body part in engagement with one side of said generally axially extending flange of said cover, said means comprising a single offset tab extending from said principal body part and engaging the other side of said generally axially extending flange of said cover, said clip retaining means having a first terminal portion engageable with the generally axially extending flange portion of said vehicle wheel, and a second terminal portion comprising a single leg extending at an angle to said main body portion and having an underturned generally radially inwardly extending extremity at one end thereof, said second terminal portion fitting between the main body portion and the underturned flange of said cover with said generally radially inwardly extending extremity engaging the main body portion of said cover.

7. In combination, a vehicle wheel, a cover for disposition at the outer side of said vehicle wheel, said vehicle wheel including a generally axially extending flange portion, said cover comprising a main body portion having an underturned flange at the periphery thereof, a generally axially extending flange extending inwardly from said underturned flange, clip retaining means for securing said cover to said vehicle wheel, said clip retaining means comprising a principal body part, means for holding said principal body part in engagement with one side of said generally axially extending flange portion of said cover, said means comprising a pair of tabs offset from said principal body part and positioned at either side thereof, said tabs engaging the other side of said generally axially extending flange of said cover, said clip means having a first terminal portion engageable with the generally axially extending flange portion of said vehicle wheel, and a second terminal portion comprising a pair of legs extending at an angle to said main body, each leg having an underturned generally radially inwardly extending extremity at one end thereof, said second terminal portion fitting between the main body portion and the underturned flange of said cover with said generally radially inwardly extending extremity engaging the main body portion of said cover.

8. In combination, a vehicle wheel having a generally axially extending flange portion, a cover for disposition at the outer side of said vehicle wheel comprising a main body portion haivng an underturned flange at the periphery thereof and a generally axially extending flange extending inwardly from said underturned flange, and clip retaining means for securing said cover to said vehicle wheel comprising, a principal body part, means for holding said principal body part in engagement with one side of said generally axially extending flange of said cover, said means comprising an offset portion of said clip retaining means engaging the other side of said generally axially extending flange of said cover, said clip retaining means having a first terminal portion engageable with the generally axially extending flange portion of said vehicle wheel, and a second terminal portion comprising means extending at an angle to said main body portion and having an underturned generally radially inwardly extending extremity at the end thereof, said second terminal portion fitting between the main body portion and the underturned flange of said cover with said generally radially inwardly extending extremity having a serrated edge engaging the main body portion of said cover.

9. In combination, a vehicle wheel including a generally axially extending flange portion, a cover for disposition at the outer side of said vehicle wheel comprising a main body portion having an underturned flange at the periphery thereof and a generally axially extending flange extending inwardly from said underturned flange, and clip retaining means for securing said cover to said vehicle wheel comprising, a principal body part, means for holding said principal body part in engagement with one side of said generally axially extending flange of said cover, said means comprising an offset portion of said clip retaining means engaging the other side of said generally axially extending flange of said cover, said clip retaining means having a first terminal portion engageable with the generally axially extending flange portion of said vehicle wheel, and a second terminal portion comprising means extending at an angle to said main body portion and having an underturned generally radially inwardly extending extremity at the end thereof, said second terminal portion fitting between the main body portion and the underturned flange of said cover with said generally radially inwardly extending extremity having a serrated edge engaging the main body portion of said cover at a substantial angle.

References Cited in the file of this patent
UNITED STATES PATENTS

| | | |
|---|---|---|
| 2,200,047 | Tinnerman | May 7, 1940 |
| 2,329,921 | Lyon | Sept. 21, 1943 |
| 2,475,021 | Gibbons et al. | July 5, 1949 |
| 2,624,626 | Lyon | Jan. 6, 1953 |
| 2,719,757 | Gaylord | Oct. 4, 1955 |
| 2,729,508 | Lyon | Jan. 3, 1956 |
| 2,809,076 | Plotkin | Oct. 8, 1957 |
| 2,827,332 | Chamberlin | Mar. 18, 1958 |
| 2,842,403 | Lyon | July 8, 1958 |
| 2,910,323 | Spisak | Oct. 27, 1959 |